(12) United States Patent
Hinteregger (10) Patent No.: US 7,389,729 B2
(45) Date of Patent: Jun. 24, 2008

(54) METHOD FOR HEATING A GONDOLA OF A CABLEWAY SYSTEM, A GONDOLA SUITABLE THEREFOR AND A CABLEWAY SYSTEM

(75) Inventor: Christoph Hinteregger, Wolfurt (AT)

(73) Assignee: Innova Patent GmbH, Wolfurt (AT)

( * ) Notice: Subject to any disclaimer, the term of this patent is extended or adjusted under 35 U.S.C. 154(b) by 289 days.

(21) Appl. No.: 11/226,984

(22) Filed: Sep. 15, 2005

(65) Prior Publication Data

US 2006/0060104 A1 Mar. 23, 2006

(30) Foreign Application Priority Data

Sep. 15, 2004 (AT) .............................. A 1556/2004

(51) Int. Cl.
*B61B 7/00* (2006.01)
(52) U.S. Cl. .................. 104/173.1; 105/149.1
(58) Field of Classification Search .............. 104/173.1, 104/184; 105/148, 149.1, 149.2, 150
See application file for complete search history.

(56) References Cited

U.S. PATENT DOCUMENTS

| 4,187,784 | A | * | 2/1980 | Fernandez et al. | ........ 104/173.1 |
| 4,310,745 | A | * | 1/1982 | Bender | ........................ 219/213 |
| 4,327,648 | A | * | 5/1982 | Anton | ...................... 105/149.1 |
| 4,635,561 | A | * | 1/1987 | Tauzin | ...................... 104/173.2 |
| 5,383,407 | A | * | 1/1995 | Souchal | ...................... 105/149.1 |
| 6,294,768 | B1 | * | 9/2001 | Liebich | ...................... 219/528 |
| 6,862,998 | B2 | * | 3/2005 | Doppelmayr | ............ 105/149.1 |

FOREIGN PATENT DOCUMENTS

JP 9-93705 A 4/1997

* cited by examiner

*Primary Examiner*—Lars A Olson
(74) *Attorney, Agent, or Firm*—Laurence A. Greenberg; Werner H. Stemer; Ralph E. Locher (57) ABSTRACT

A method for heating a gondola of a cableway system and a gondola that is suitable for carrying out the process, as well as a cableway system with gondolas of the type. In order to increase passengers' comfort when being conveyed, the floor or parts of the floor is or are heated by an electrical heating device integrated in the floor in particular while the gondola is situated in a station of the cableway system.

27 Claims, 6 Drawing Sheets

METHOD FOR HEATING A GONDOLA OF A CABLEWAY SYSTEM, A GONDOLA SUITABLE THEREFOR AND A CABLEWAY SYSTEM

BACKGROUND OF THE INVENTION

Field of the Invention

The invention relates to a method for heating a gondola of a cableway system, a gondola suitable therefor, and a cableway system having a gondola of this type.

Although the passenger compartments in cable railroads are protected against wind and weather, they offer little comfort particularly when it is very cold. The gondola cabins cool down greatly, particularly at low temperatures.

SUMMARY OF THE INVENTION

It is accordingly an object of the invention to provide a method for heating a gondola of a cableway system, a gondola suitable therefor, and a cableway system having a gondola of this type, which overcome the above-mentioned disadvantages of the heretofore-known devices and methods of this general type and which provides for increased comfort.

With the foregoing and other objects in view there is provided, in accordance with the invention, a method of heating a gondola of a cableway system, the method which comprises:
 providing an electrical heating device in the gondola of the cableway system; and
 heating at least a portion of a floor of the gondola with the electrical heating device.

With the above and other objects in view there is also provided, in accordance with the invention, a gondola of a cableway system, comprising:
 a floor, a roof, side walls between said floor and said roof, and, optionally, seats at said walls; and
 an electrically operated heating device disposed to heat at least a portion of said floor.

With the above and other objects in view there is also provided, in accordance with the invention, a cableway system that includes a multiplicity of gondolas for conveying persons as summarized above.

In other words, the invention may be summarized in that the floor or parts of the floor are heated by an electrical heating device integrated in the floor particularly during that time when the gondola is situated in a station of the cableway system. As a result, the floor can be pre-temperature-regulated to a temperature which the passengers find pleasant before or while the passengers are embarking.

One advantageous refinement of the method provides for the heating device to be supplied with power only for a specific period of time wherein the gondola is situated within a cableway station.

In particular, the duration and/or the intensity of the power supply may be regulated in a manner dependent on the local external temperature. This means that the floor of the gondola is heated to a greater extent or for longer, the colder the conditions.

In one embodiment of the invention, the power supply of the heating device is interrupted as soon as the temperature of the heated part of the floor reaches a predetermined maximum temperature. Said maximum temperature may likewise be defined in a manner dependent on the local external temperature.

In one preferred embodiment of the invention, at least one current collector electrically connected to the heating device is provided on the gondola, the latter's suspension, running gear or fixing device to the cable, said current collector interacting with at least one contact device provided in the station of the cableway system.

Upon entering a cableway station, the current collector comes into contact with a contact device provided in the cableway system, so that current can flow through the heating device and heats the gondola.

The current collector may comprise both roller-type contacts and sliding-action contacts which interact with a contact device configured correspondingly in each case. Said contact device is preferably designed as a busbar arranged along the conveying path of the gondola in the cableway system.

An advantageous alternative provides for the energy transmission to be transmitted contactlessly in the form of an inductive coupling. In this case, a corresponding device builds up an alternating electric field that is picked up by a corresponding device from the gondola and serves for the operation of the heating device.

Exemplary embodiments of the invention are explained in more detail below with reference to the drawing. Further features, advantages and possible applications of the invention emerge from the drawing and its description.

Other features which are considered as characteristic for the invention are set forth in the appended claims.

Although the invention is illustrated and described herein as embodied in a Method for Heating a Gondola of a cableway system, a gondola suitable therefor and a cableway system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DESCRIPTION OF THE PREFERRED EMBODIMENTS

Figure 1:
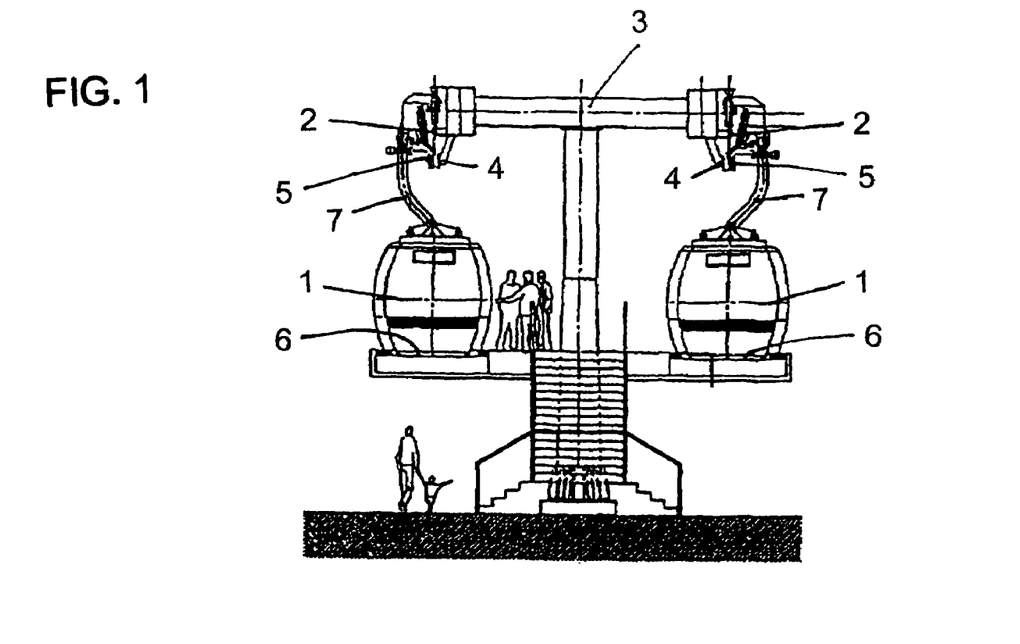
FIG. 1 is an elevational view of a station of a cableway system with two gondola cars in the station.

Referring now to the figures of the drawing in detail and first, particularly, to FIG. 1 thereof, there is shown a station of a cableway system. The exemplary embodiment illustrated involves an intermediate station that is disposed between two terminal stations. Gondolas 1 (also referred to as cabins, trams, cars) have a grip or running gear 2, which can be uncoupled in the stations from a circulating haul cable. While the gondolas 1 are uncoupled, they are moved through the stations on rails at a considerably reduced speed as compared to their travel speed.

The suspension bar, the running gear, and the rails are not illustrated in much detail in FIG. 1, as they may be embodied in a conventional manner.

The rails are fixed to a T-shaped support 3, busbars 4 being fitted to the support 3 below the rails. Assigned current collectors 5 are fitted to the running gear 2. The current collectors 5 are connected to heating devices situated in the base or floor 6 of the gondolas. The heating device may extend over the entire extent of the floor 6 or else only in those regions where either passengers stand or the feet of seated passengers are situated. In this case, the floor may comprise, in a customary manner, sheet steel plates that may be covered by rubber mats as required. Situated under the sheet steel plates is the electrical heating device in the form of heating blankets or e.g. heating coils laid in meandering fashion, which permit an as far as possible direct heat exchange with the base or floor plate. Situated beneath the electrical heating device there is ideally an insulating layer in order as far as possible to prevent a loss of the heat downward, that is to say to the surroundings. If, for instance, heating coils laid in meandering fashion are used, it is also possible to insert them into an insulating plate embodied with correspondingly shaped grooves.

The busbars 4 ideally extend along the entire travelway of the gondolas 1 in the station, so that there is enough time to heat the floor 6. The busbars may be provided in all of the stations of a cableway system, that is to say the valley station and the mountain station and possible intermediate stations or else only in one station, e.g. the valley station, or in a garage. However, the busbars may also extend only over a partial region of the travelway of the gondolas 1 in the station. In order to prevent the floor from being heated to an unnecessarily great extent, which not only may be found unpleasant by the passengers but also causes an unnecessarily high energy consumption, it is possible, by means of a suitable control, to limit the period of time wherein the floor plate is heated by the heating device. This period of time may be adjustable in dependence on an internal temperature in the gondola and/or the temperature of the heated part of the floor and/or the ambient temperature. As an alternative or in addition, it is also possible to provide temperature sensors which turn off the heating device when a maximum temperature of the heated part of the floor and/or the interior of the gondola has been reached. Equally, it is also possible to interrupt the power supply of the heating device when the gondolas are at a standstill.

Also conceivable are embodiments of the floor of the gondola wherein the heating device is arranged in a floor plate with a relatively large height and corresponding cutouts for the heating device in order that the latter has a high heat storage capacity. However, this high heat storage capacity may, of course, also be achieved by means of other additional storage elements in the region of the floor plate. This high heat storage capacity has the advantage that the floor plate only has to be heated while it is situated in stations, and maintains a temperature which is pleasant for the passengers until the next station is reached.

In this connection, heat-storing elements are also conceivable which have a latent heat-storing capacity at operating temperature, since, in the case of these elements, heat can be supplied and dissipated without the temperature of the element changing appreciably.

Figure 2:
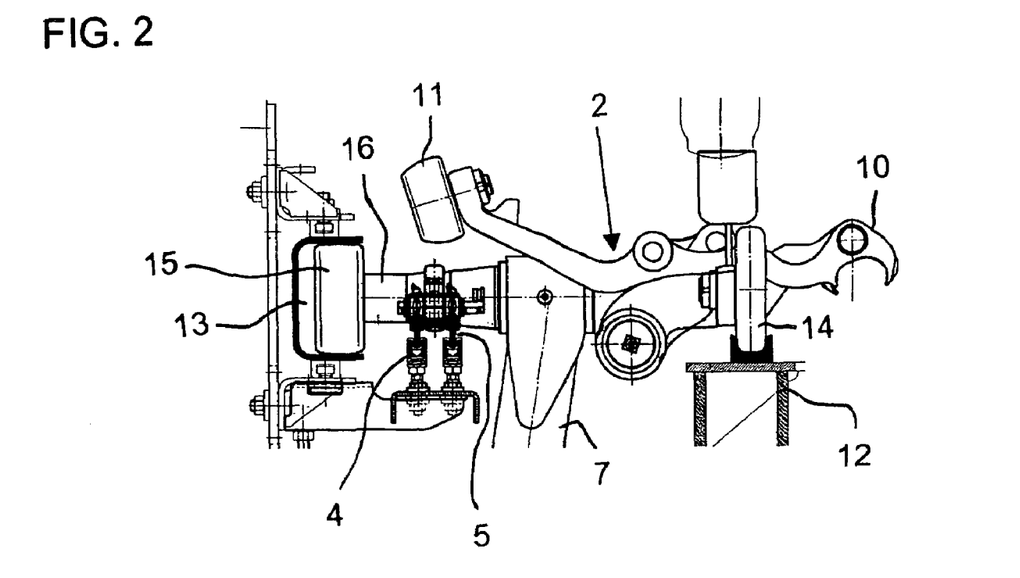
FIG. 2 is a detail showing a running gear and an exemplary embodiment of a current collector assembly.

Reference is now had to FIG. 2, which illustrates the running gear 2 during its travel through (or standstill in) a station. A main haulage cable clamp 10 is currently swung open, by pressing a cam roller 11 downwardly. The gondola 1, which is mounted to the running gear 2 via a hang bar or carrying rod 7, travels on two parallel rails 12 and 13. Rollers 14 and 15 are rotatably supported on a cross-rod 16 and they roll on the rails 12 and 13, respectively. The current supply necessary for charging the floor heater is transferred through the current rails 4 and the current collectors 5. The current collectors 5 illustrated in FIG. 2 are slide collectors or sliding contact collectors.

The contact device, comprising the busbar 4 and the current collector 5, may be implemented in a variety of embodiments within the scope of the invention. By way of example, reference is made to current collectors with roller-type contacts or current collectors with sliding-action contacts.

Figure 3A:
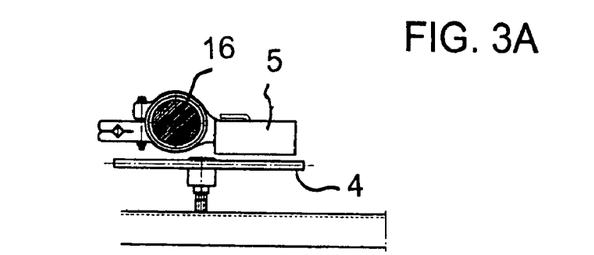
FIGS. 3A-3D illustrate exemplary details of a the current collector assembly.

FIG. 3A illustrates the current collector 5 implemented as an inductive current collector 5 and the rail 4 is an inductive line 4. Where the contact assembly is embodied not as a direct electrical contact device but rather as an inductive contact device for transmission of energy, the elements for transmission of energy can be electrically insulated and, consequently, for fitters or maintenance personnel there is no risk of coming directly into contact with the live parts.

Figure 3B:
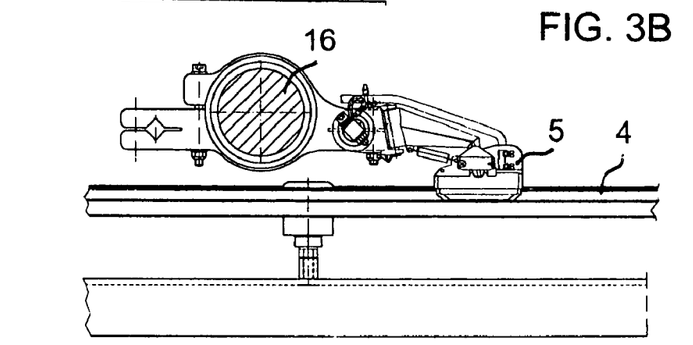

FIG. 3B illustrates the current collector 5 implemented as an sliding contact element, as also illustrated in FIG. 3. The sliding contact element 5 slides on the current rail 4.

Figure 3C:
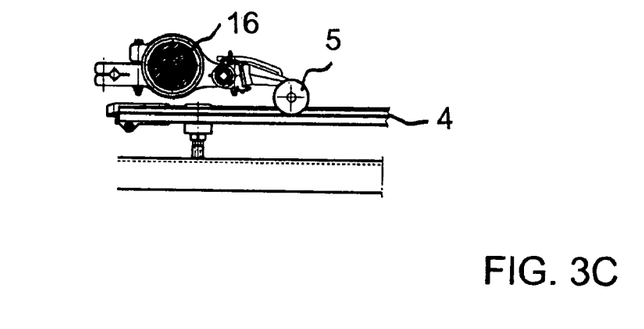

FIG. 3C illustrates the current collector 5 implemented with a roller contact element which rolls on the current rail 4 as the gondola travels through the station.

Figure 3D:
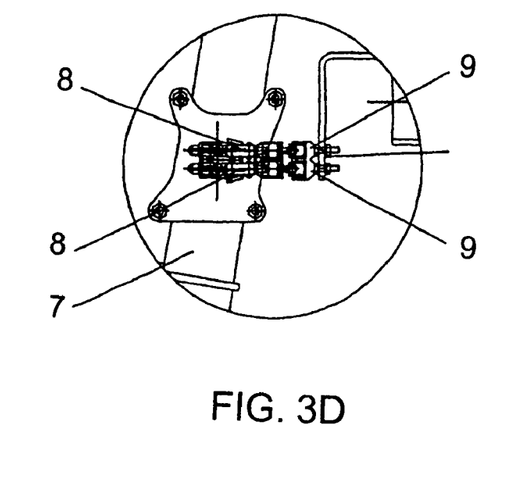

FIG. 3D illustrates an embodiment of a contact device wherein current collectors 8 are fixed to the carrying rod 7. The current collectors 8 are in electrical contact with current conductors 9 fixed to the support 3.

Figure 4:
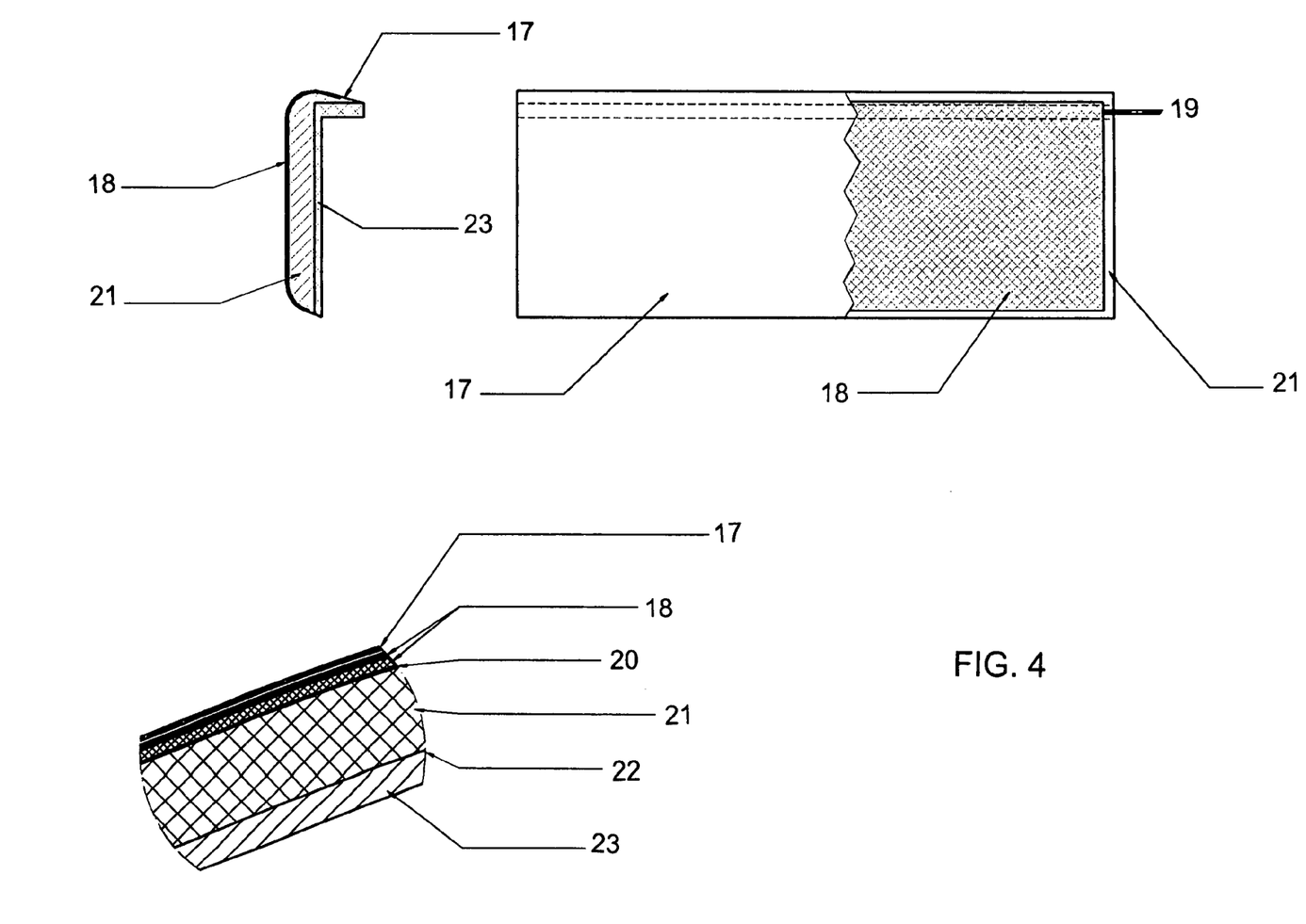
FIG. 4 is a plan view and two sectional views illustrating an exemplary embodiment of a bench heater for the gondola.

FIG. 4 illustrates an exemplary embodiment of a bench heater for the gondola. The bench, by way of example, may be upholstered with a faux leather or fabric cover layer 17. A heating element in the form of a heating mat 18 receives its energy supply via a cable 19. The heating mat 18 should be insulated so as to avoid any possible injury to the passengers. A water-tight foil 20 is preferably placed between the heating mat 18 and a foam core 21 of the seat. The foam core 21 may be formed of open-cell foam. A water-tight foil 22 separates the foam core 21 from a rigid support 23.

Figures 5, 6, 7:
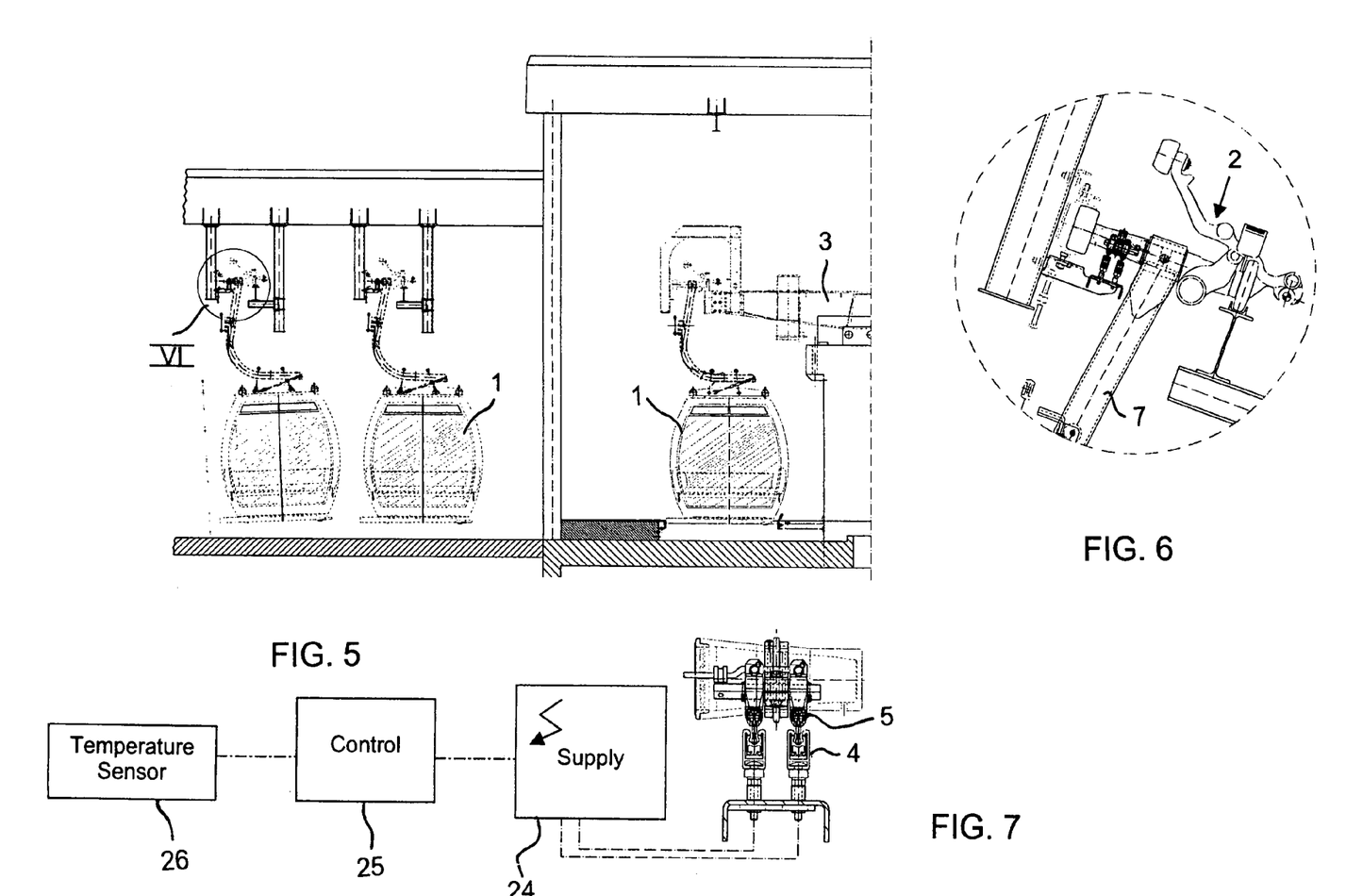
FIG. 5 is a partial elevational view illustrating a station and gondola depot according to the invention.
FIG. 6 is a view of the detail VI in FIG. 5, of a running gear position in the depot.
FIG. 7 is a diagrammatic view of a control system according to the invention.

Referring now to FIGS. 5 and 6, the energy transfer, i.e., the current supply and charging of the heating device in the gondola, may be effected during the travel of the gondola through the station, or it may be effected at a side rail in a gondola depot. Spare gondolas (e.g., the two gondolas illustrated on the left in FIG. 5) may be injected into the circuit during peak times. These gondolas 1 are then already charged and heated upon boarding by the passengers.

An exemplary control system according to the invention is illustrated in FIG. 7. There, an energy supply 24 is driven by a control unit 25. Preferably, the control unit 25 receives information concerning the ambient temperature from a temperature sensor 26 and controls the energy supply 24 accordingly. The latter may be a generator, a battery, a solar collector system, a regular utility-connected system, or the like.

Figure 8:
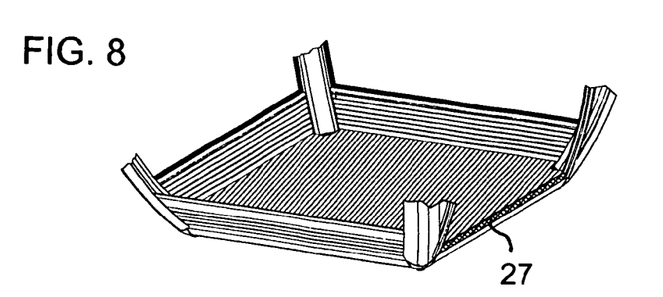
FIG. 8 is a partial perspective view of a bottom portion of a cabin of a gondola provided with a floor heater.
Figure 9:
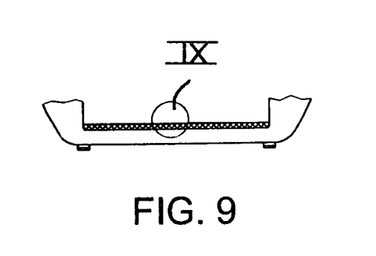
FIG. 9 is a sectional view thereof.

With reference to FIGS. 8 and 9 a heat reservoir layer 27 may cover the entire base of the gondola cabin or it may be strategically placed at given locations only, such as, for example, along central strips at which the passengers' boots would normally come to be placed.

Figure 9A:
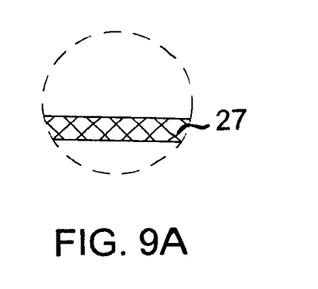
FIGS. 9A-9F are detail views of various embodiments of the floor heater according to the invention.

FIG. 9A shows a detail in which the floor of the cabin is provided with a heat reservoir or heat accumulator 27, preferably a latent heat storage device.

Figure 9B:
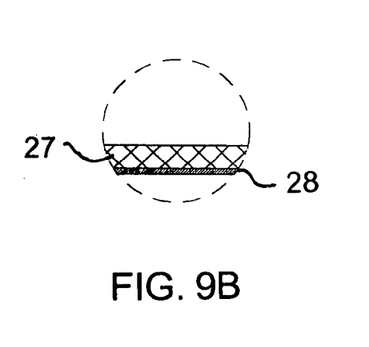

In FIG. 9B, the heat reservoir 27 is provided with a downward insulation layer 28. The heat content is useful only for heating the base above, and any heat exchange below the floor would be considered a loss.

Figure 9C:
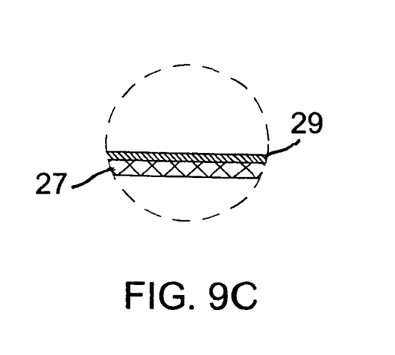

FIG. 9C shows an active heater 29 (e.g., a resistance heater) on top of the heat reservoir 27.

Figure 9D:
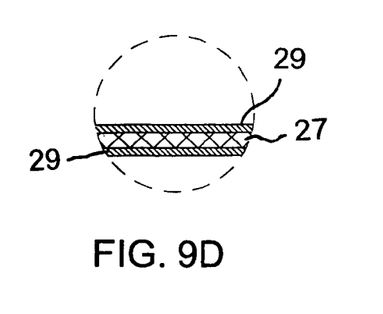

FIG. 9D shows an embodiment in which an active heater 29 (e.g., a resistance heater) is placed on top of the heat reservoir 27 and on the bottom.

Figure 9E:
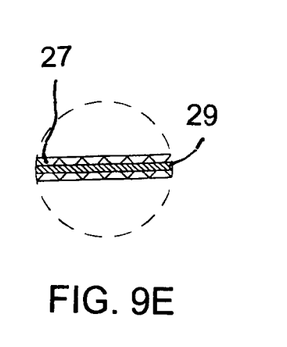

FIG. 9E illustrates the heater 29 integrated in the heat reservoir 27.

Figure 9F:
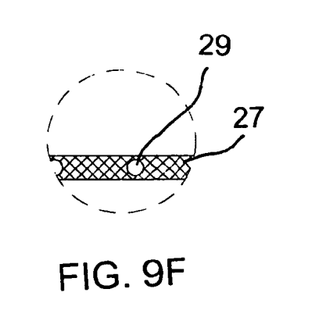

FIG. 9F shows the active heater 29 in the form of conductive lines integrated in the heat reservoir 27. The lines may, for example, be disposed in a grid or in a meandering course.

Figure 10:
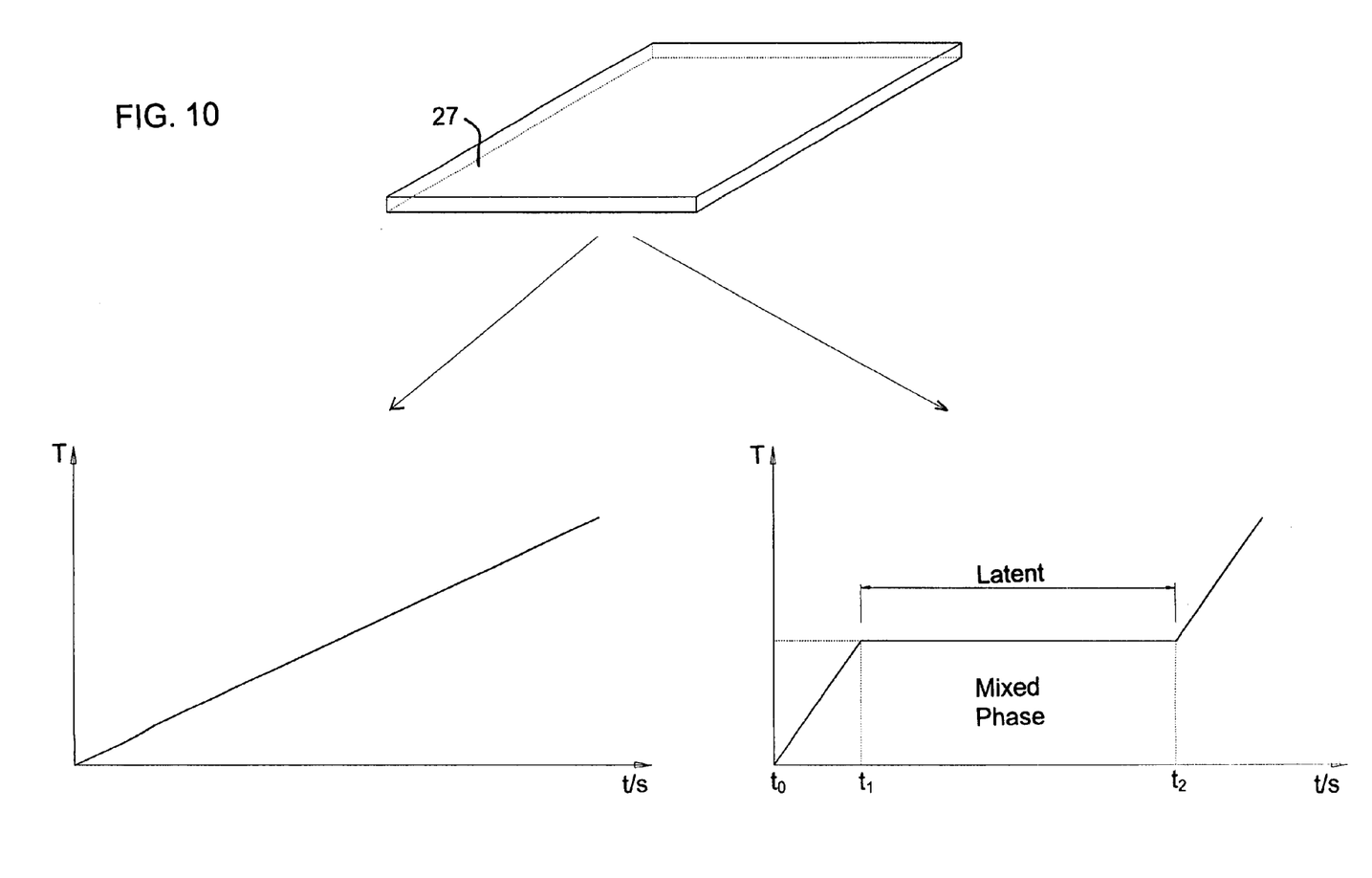
FIG. 10 is a juxtaposition of two graphs illustrating the heat storage behavior of conventional heat reservoir and a latent storage device.

Referring, finally, to FIG. 10, the heat reservoir 27 on the base of the gondola is preferably a latent heat storage device. The difference and the advantage is immediately clear when the characteristic temperature lines of a prior art heat reservoir (left-hand graph) are compared with the latent heat storage device (right-hand graph) according to the invention. Here, we deal with heat reservoirs with a heat storage capacity in the range of 2 to 600 J/cm². The temperature T and the time (or entropy) in the conventional prior art device have a linear relationship. In the latent device, the temperature T rises from a time to $t_0$ a time $t_1$. In that time period, the system is in solid phase. Once the operating temperature (e.g., 20 to 50° C.) has been reached, the system reaches a mixed phase, i.e., solid and liquid, for the time period between $t_1$ and $t_2$. At the time $t_2$, the system temperature would then start to rise upon further heating and the system would be substantially in liquid phase.

This application claims the priority, under 35 U.S.C. § 119, of Austrian patent application No. AT 1556/2004, filed Sep. 15, 2004; the entire disclosure of the prior application is herewith incorporated by reference.

I claim:

1. A method of heating a gondola of a cableway system, the method which comprises:
   providing an electrical heating device in the gondola of the cableway system;
   moving the gondola through a station of the cableway system; and
   temporarily connecting the heating device to an electrical current while the gondola traverses the station, by electrically connecting a current collector mounted to a running gear or a grip device of the gondola with at least one contact device disposed in the station, and heating at least a portion of a floor of the gondola with the electrical heating device.

2. The method according to claim 1, which comprises heating the floor while the gondola is situated in a station of the cableway system.

3. The method according to claim 1, which comprises supplying the heating device with power for only a specific period of time.

4. The method according to claim 1, which comprises regulating at least one of a duration and an intensity of a power supply to the heating device in dependence on a local exterior temperature.

5. The method according to claim 1, which comprises interrupting a power supply of the heating device when a temperature of a heated portion of the floor has reached a predetermined maximum temperature.

6. The method according to claim 1, which comprises interrupting a power supply when the cableway system is at a standstill.

7. The method according to claim 1, which comprises operating the heating device exclusively while the gondola is situated in the station.

8. A gondola of a cableway system, comprising:
   a floor, a roof, side walls between said floor and said roof, and, optionally, seats at said walls;
   an electrically operated heating device disposed to heat at least a portion of said floor; and
   at least one current collector electrically connected to said heating device and mounted to a running gear or a grip device for fixing the gondola to a haul cable of the cableway system, said current collector interacting with at least one contact device disposed in a station of the cableway system.

9. The gondola according to claim 8, wherein said current collector includes roller contacts.

10. The gondola according to claim 8, wherein said current collector includes slide-action contacts.

11. The gondola according to claim 8, wherein said contact device includes a busbar disposed along a travelway of the gondola in the station.

12. The gondola according to claim 8, wherein said current collector and said contact device form part of a device for inductive energy transmission.

13. The device according to claim 8, wherein a heating assembly comprises said heating device and an element with good thermal storage capacity at operating temperature.

14. The gondola according to claim 13, wherein said element has a flat, plate-type configuration.

15. The gondola according to claim 13, wherein said heating device bears on or surrounds said element at least in regions thereof.

16. The gondola according to claim 13, wherein said heating device is disposed within said element.

17. The gondola according to claim 13, which comprises a thermally insulating layer on a side of said element and said heating device remote from a passenger compartment of the gondola.

18. The gondola according to claim 13, wherein said element, or a substance contained in said element, has a latent heat-storing capacity at operating temperature.

19. The gondola according to claim 8, wherein said heating device has a planar form with heating lines for emitting heat integrated therein or disposed thereon.

20. The gondola according to claim 19, wherein said heating lines are electrical heating conductors.

21. The gondola according to claim 8, which further comprises a control device connected to and controlling said heating device.

22. The gondola according to claim 21, which further comprises a temperature sensor connected to said control device for detecting a temperature of a heated part of said floor.

23. The gondola according to claim 21, which comprises a further temperature sensor connected to said control device for detecting a temperature of an ambient temperature of the gondola and/or a temperature in a station of the cableway system.

24. A cableway system, comprising a multiplicity of gondolas for conveying persons each according to claim 8.

25. The cableway system according to claim 24, which further comprises a tram depot for garaging the gondolas when the gondolas are not used, and busbars disposed in said tram depot and connected to an external energy source.

26. A cableway system, comprising:
   a multiplicity of gondolas each having:
      a floor, a roof, side walls between said floor and said roof, a running gear or a grip device for fixing the gondola to a haul cable of the cableway system, and, optionally, seats at said side walls;
      an electrically operated heating device disposed to heat at least a portion of said floor;
      at least one current collector electrically connected to said heating device and mounted to the running gear or grip device of the gondola; and
   busbars disposed in at least one station of the cableway system and connected to an external energy source for electrically connecting to said current collector and energizing said heating device of each said gondola.

27. The cableway system according to claim 26, which comprises a temperature sensor for ambient temperature and/or a central controller for said heating device disposed in at least one station of the cableway system.

* * * * *